March 26, 1929.　　　S. POWERS　　　1,706,899
RESISTANT VEHICLE OR AUTOMOBILE BRAKE
Filed Oct. 12, 1925　　　2 Sheets-Sheet 2

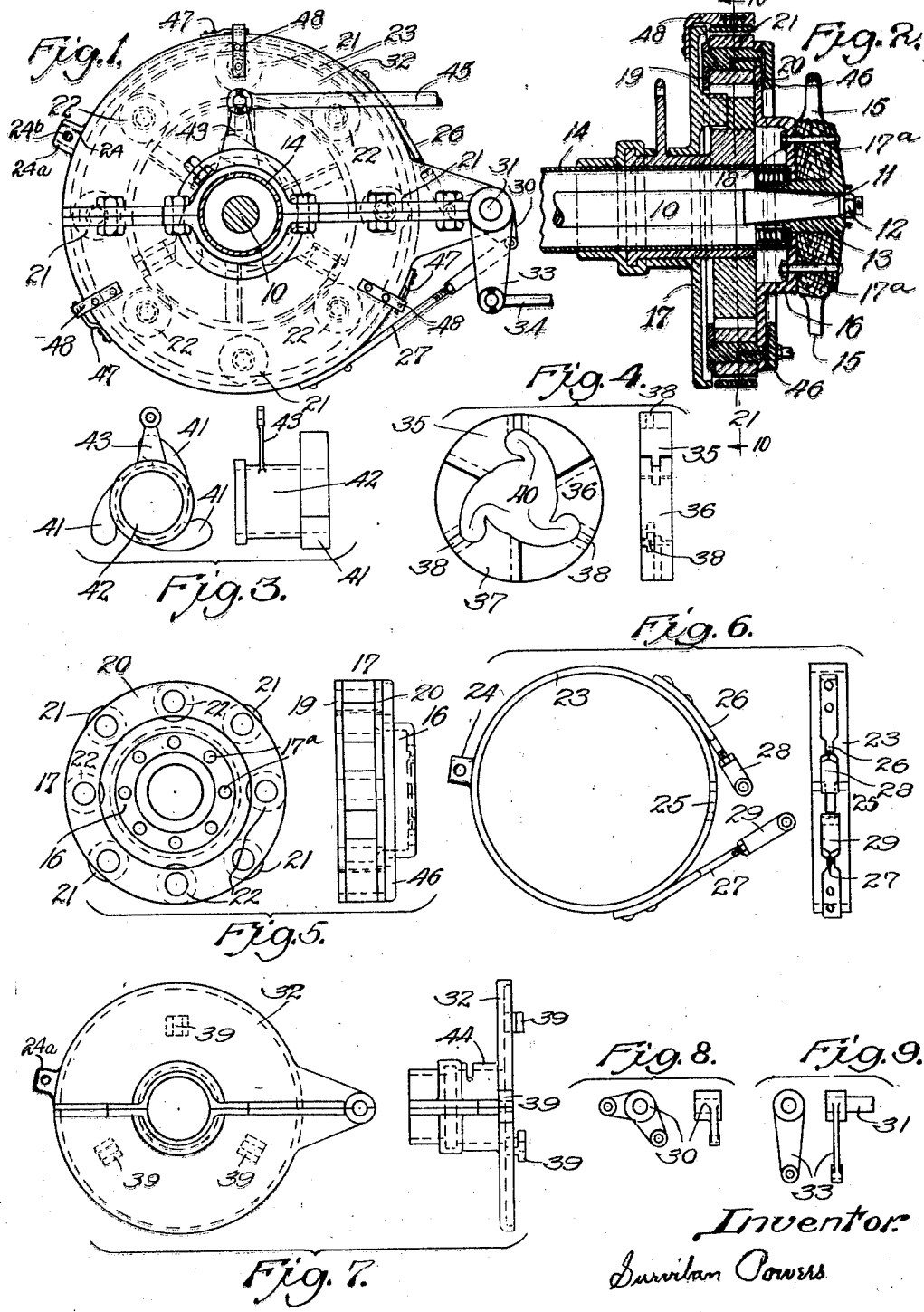

INVENTOR
Survilgh Powers
BY H. G. Manning
ATTORNEY

Patented Mar. 26, 1929.

1,706,899

UNITED STATES PATENT OFFICE.

SURVILAN POWERS, OF WATERBURY, CONNECTICUT.

RESISTANT VEHICLE OR AUTOMOBILE BRAKE.

Application filed October 12, 1925. Serial No. 62,030.

This invention relates to vehicles, and more particularly to an improved brake mechanism for an automobile.

One object of this invention is to provide a brake mechanism constructed of all metal parts and having no brake linings which require to be renewed.

A further object is to provide a brake construction in which "screeching" and other disagreeable noises which accompany the use of friction brakes will be eliminated.

A further object is to provide a vehicle brake of the above nature which will be relatively simple in construction, inexpensive to manufacture, easy to install and manipulate, and very efficient and durable in use.

With these and other objects in view, there has been illustrated on the accompanying drawings, one form in which the invention may be conveniently embodied in practice.

Fig. 1 represents an end view of the brake as it appears in assembled position.

Fig. 2 is a side sectional view of the same.

Fig. 3 represents end and side views respectively of the cam for expanding the interior sectional brake disc, this figure as well as Figs. 4 to 9 inclusive being drawn on a smaller scale than Figs. 1 and 2.

Fig. 4 represents end and side views respectively of the sectional brake disc.

Fig. 5 represents end and side views respectively of the brake drum.

Fig. 6 represents end and side views respectively of the foot-operated brake band which is located on the exterior of the brake drum.

Fig. 7 represents end and side views respectively of the outer frame for housing the expanding disc and cam mechanism.

Fig. 8 represents end and side views respectively of the bell-crank lever for contracting the brake band.

Fig. 9 represents side and end views respectively of the foot-operated brake arm for actuating the bell-crank brake-contractor lever.

Figure 10:
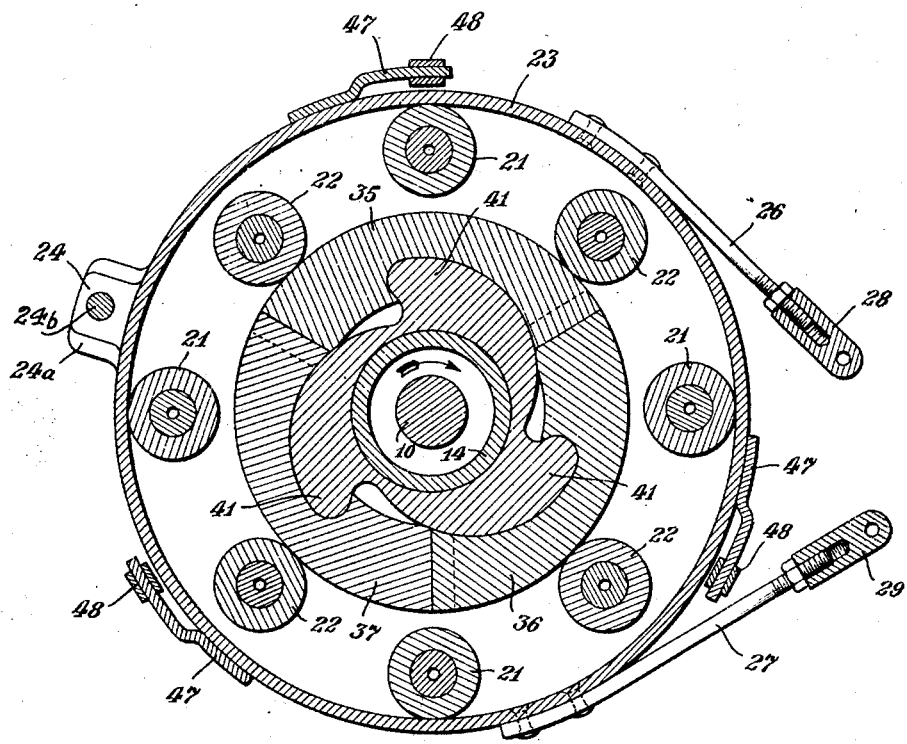
Fig. 10 is an enlarged sectional end view taken on the line 10—10 of Fig. 2, looking in the direction of the arrows.

Referring now to the drawings in which like reference numerals denote corresponding parts throughout the several views, the numeral 10 indicates an interior axle shaft having a tapered outer end 11 upon the end of which is secured a nut 12 for holding a flanged outer cap member 13 in position. Surrounding the shaft 10 is an axle tube 14, and as clearly shown in Fig. 2, the spokes 15 of the vehicle wheel are firmly held in position between said outer cap member 13 and an inner arched plate member 16 by means of bolts 17$^a$ having nuts 18 on their inner ends.

The arched plate member 16 forms the front section of a double-acting brake drum, generally indicated by the numeral 17 and comprising a pair of parallel annular plates 19 and 20. The plates 19 and 20 are provided with bearings for rotatably receiving four outer rollers 21 and four inner rollers 22. Each of said rollers has its ends reduced for fitting within a corresponding number of circular apertures in said plates 19 and 20. The four outer rollers 21 are located with their axes in a circle of such a diameter that the outer edges of said rollers will project outwardly beyond the outer edge of the brake drum 17. The four inner rollers 22 are also located with their axes on a circle, but in this instance said circle is of such a diameter that the inner rollers will project inwardly beyond the inner edge of the brake drum 17.

The outer rollers 21 are adapted to form a bearing for a foot-operated split brake band 23 which surrounds said rollers and is secured, as by a lug 24, to a lug 24$^a$ on the frame 32, to be described later, said lugs being joined by a rivet 24$^b$. The ends of the brake band 23 are interfitted by a tongue and slot connection 25 as clearly shown in Fig. 6, this construction allowing the band 23 to engage the drum rollers 21 throughout its circumference.

In order to permit the brake band 23 to be contracted into tight engagement with the outer rollers 21 of the drum 17, provision is made of a pair of short rods 26 and 27 riveted tangentially to the band 23 adjacent its ends. The short rods 26 and 27 have their outer ends adjustably secured, as by interiorly threaded tubular members 28 and 29 to a bell-crank contractor lever 30, most clearly shown in Fig. 8. The bell-crank lever 30 is rigidly secured to a shaft 31 journaled within a two-part frame 32 to be hereinafter more fully described. The other end of the shaft 31 has rigidly secured thereto a brake-operating arm 33 adapted to be connected by a rod 34 to a foot-operated pedal, not shown.

The emergency brake for the automobile comprises an expanding disc of three complementary sections 35, 36, and 37, each of said sections having a circular outer periphery and being provided midway between its ends with a T-shaped radial recess 38 for slidable engagement with a similarly shaped lug 39 formed on the outer casing 32. Each of the sections 35, 36, and 37 is provided on its interior edge with an arcuate recess 40 shaped to fit an elongated convex lug 41 formed on the exterior of a cam 42 slidably located within said sections 35, 36, and 37. The cam 42 has an operating arm 43 extending outwardly through a tubular extension 44 of the outer frame 32 and is connected at its extremity to a rod 45 leading to a hand-operated emergency brake lever, not shown.

In order to protect the front of the rollers 21 and 22 from dust, etc., provision is made of a cover plate 46 lying outside the drum plate 20. Three sets of clip members 47 and 48 are also provided on the frame 32 for holding the outer brake band in proper position.

In operation, when the driver desires to operate the foot brake, he will press his foot upon the foot pedal, not shown, causing the rod 34 to be pulled to the right as viewed in Fig. 1, thereby rotating the arm 33 and the bell-crank contractor lever 30. This will cause the short rods 26 and 27 to be pulled toward each other whereby the brake band 23 will be contracted and will exert sufficient pressure upon the set of four outer rollers 21 to retard the car to the desired extent.

When the driver desires to operate the emergency brake, either alone or in conjunction with the foot brake, he will pull upon the emergency lever, not shown, causing the rod 45 to be pulled to the right, as viewed in Fig. 1. This will produce clockwise rotation of the cam 42, the three curved lugs 41 of which will then force the sections 35, 36, and 37 of the expanding disc to move outwardly into contact with the set of four inner rollers 22, said sections 35, 36, and 37 being guided in their outward radial movement by the interlocking T-shaped recesses and lugs 38 and 39. The expansion of the three-part disc will bring the sections thereof into engagement with the inner set of rollers 22 on the brake drum 17 thereby effecting the desired retardation of the wheels and vehicle.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a vehicle brake, a drum member adapted to be secured to a wheel of the vehicle, said drum member having a plurality of rollers journaled therein and extending beyond the inner and outer peripheries thereof, a contracting brake band surrounding said drum member, expanding brake means inside thereof, and means for selectively operating said contracting and expanding brake means independently or together.

2. In a vehicle brake, a drum member adapted to be secured to a wheel of the vehicle, a set of rollers journaled in said drum member and extending beyond the outer periphery thereof, a contracting brake band surrounding said drum member, expanding brake means inside thereof, and means for selectively operating said contracting and expanding brake means independently or together.

3. In a vehicle brake, a drum member adapted to be secured to a wheel of the vehicle, a set of rollers journaled in said drum member and extending beyond the inner periphery thereof, a contracting brake band surrounding said drum member, expanding brake means inside thereof, and means for selectively operating said contracting and expanding brake means independently or together.

4. In a vehicle brake, a drum member adapted to be secured to a wheel of the vehicle, said drum member comprising a pair of parallel side annular plates, two sets of alternately arranged rollers journaled between said plates, the rollers of one set extending beyond the outer periphery of said plates the rollers of the other set extending beyond the inner periphery of said plates, and braking means for selectively engaging said outer and inner rollers.

SURVILAN POWERS.